United States Patent
Chakravarty

(10) Patent No.: US 12,165,080 B2
(45) Date of Patent: Dec. 10, 2024

(54) LEVERAGING BIG DATA, STATISTICAL COMPUTATION AND ARTIFICIAL INTELLIGENCE TO DETERMINE A LIKELIHOOD OF OBJECT RENUNCIATION PRIOR TO A RESOURCE EVENT

(71) Applicant: BANK OF AMERICA CORPORATION, Charlotte, NC (US)

(72) Inventor: Srinath S. Chakravarty, Plano, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 974 days.

(21) Appl. No.: 17/174,761

(22) Filed: Feb. 12, 2021

(65) Prior Publication Data

US 2022/0261666 A1    Aug. 18, 2022

(51) Int. Cl.
   *G06N 5/04*       (2023.01)
   *G06F 16/2458*    (2019.01)
   (Continued)

(52) U.S. Cl.
   CPC .......... *G06N 5/04* (2013.01); *G06F 16/2465* (2019.01); *G06F 16/283* (2019.01); *G06N 20/00* (2019.01)

(58) Field of Classification Search
   None
   See application file for complete search history.

(56) References Cited

U.S. PATENT DOCUMENTS

| 8,104,044 | B1 * | 1/2012 | Scofield | G06F 9/542 |
| | | | | 719/313 |
| 9,536,248 | B2 | 1/2017 | Kannan et al. | |

(Continued)

FOREIGN PATENT DOCUMENTS

CN    111931530 A  *  11/2020  ......... G06K 7/10821

OTHER PUBLICATIONS

Antonio, Nuno, Ana De Almeida, and Luis Nunes. "Predicting hotel booking cancellations to decrease uncertainty and increase revenue." Tourism & Management Studies 13.2 (2017): 25-39. (Year: 2017).

(Continued)

*Primary Examiner* — Hosain T Alam
*Assistant Examiner* — Anthony G Gemignani
(74) *Attorney, Agent, or Firm* — Moore & Van Allen PLLC; James C. Edwards

(57) ABSTRACT

Big data searches, statistical computation and artificial intelligence is leveraged to determine the likelihood that a user will renounce an object post-resource event. Specifically, the present invention relies on object-identifying data and user data to key a plurality of data mining searches of big data sources. In response to extracting responsive data from the big data sources, the present invention implements statistical computing to determine a go/no-go indicator that indicates either that (i) the user is unlikely to renounce (i.e., abandon, fail to use and/or return) the object post-resource event, or (ii) the user is likely to renounce (i.e., abandon, fail to use and/or return) the object post-resource event. Artificial Intelligence (AI) is used to analyze previous likelihood of renunciation determinations to determine a confidence level which is used in the statistical computation of the go/no-go indicator.

18 Claims, 7 Drawing Sheets

(51) Int. Cl.
*G06F 16/28* (2019.01)
*G06N 20/00* (2019.01)

(56) References Cited

U.S. PATENT DOCUMENTS

| | | |
|---|---|---|
| 2016/0180256 A1 | 6/2016 | Renaud et al. |
| 2017/0004487 A1* | 1/2017 | Hagen ................ G06Q 20/4016 |
| 2017/0098197 A1 | 4/2017 | Yu et al. |
| 2017/0178036 A1 | 6/2017 | Xu et al. |
| 2017/0213158 A1 | 7/2017 | Muraoka et al. |
| 2019/0258949 A1* | 8/2019 | Reyes ............. G06Q 10/06315 |
| 2019/0373101 A1 | 12/2019 | Dotan-Cohen et al. |
| 2020/0117980 A1 | 4/2020 | Friio et al. |
| 2020/0175429 A1 | 6/2020 | Beaurepaire et al. |
| 2021/0082074 A1 | 3/2021 | Lye et al. |
| 2021/0227049 A1 | 7/2021 | Demiralp et al. |
| 2021/0295224 A1 | 9/2021 | Dorofiyenko et al. |

OTHER PUBLICATIONS

Falk, Martin, and Markku Vieru. "Modelling the Cancellation Behaviour of Hotel Guests." International journal of contemporary hospitality management 30.10 (2018): 3100-3116. (Year: 2018).

\* cited by examiner

LEVERAGING BIG DATA, STATISTICAL COMPUTATION AND ARTIFICIAL INTELLIGENCE TO DETERMINE A LIKELIHOOD OF OBJECT RENUNCIATION PRIOR TO A RESOURCE EVENT

FIELD OF THE INVENTION

The present invention relates to resource events and, more specifically, in determining the likelihood of object renunciation prior to conducting a resource event as a means of insuring that a user will not renounce the object post-resource event.

BACKGROUND

In many instances, users may renounce an object after they acquired the object in a resource transaction with an entity. Renouncing the object may include lack of use of the object, abandonment of the object and/or returning the object to the entity. However, typically a user is unaware at the point in time when resource event is conducted that they will subsequently renounce the object. This is because either the user does not contemplate a renunciation before conducting the resource event and/or the user does not possess all the data necessary to make a valid determination as to whether they will renounce the object post-resource event.

Therefore, a need exists to develop systems, apparatus, computer program products and the like to inform the user prior to conducting the resource event whether the user is likely to renounce the object post-resource event. In this regard, the user can make an informed decision to assume the peril and continue inclusion of the object in the resource event, forego including the object in the resource event or identify other object(s) that the user is more likely to retain and/or utilize post-resource event.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by implementing big data searches, statistical computation and artificial intelligence to determine the likelihood that a user will renounce an object post-resource event. Specifically, the present invention relies on object-identifying data and/or user data to key a plurality of data mining searches of big data sources. In response to extracting responsive data from the big data sources, the present invention implements statistical computing to determine a go/no-go indicator that indicates either that (i) the user is unlikely to renounce (i.e., abandon, fail to use and/or return) the object post-resource event, or (ii) the user is likely to renounce (i.e., abandon, fail to use and/or return) the object post-resource event. In additional embodiments of the invention, Artificial Intelligence (AI) is used to analyze previous likelihood of renunciation determinations to determine a confidence level which is used in the statistical computation of the go/no-go indicator.

In a specific use case a mobile communication device stores an application, i.e., and "app" that allows for users to capture a coded image (e.g., Universal Product Code (UPC)) or the like, which, when read, serves as the object-identifying data and, subsequently, user data is acquired from the app and/or other apps and services stored or executing or the mobile communication device. In another specific use case, a widget is embedded in a web browser, such that as the user browses objects on a web sites or places objects in an electronic cart, the user is provided an option as to whether they would like determine the likelihood of renunciation of the object. In such instance, the website provides the widget with the object-identifying data and the user data is provided by the widget or other applications or services executing and/or stored on the Internet-enabled computing device.

Once the mobile device has captured the image of the code or the widget has identified the object, real-time processing ensuing in which a determination is made to likeliness of object renunciation and the app presents the user with the appropriate go/no-indicator indicating either that (i) the user is unlikely to renounce the object, or (ii) the user is likely to renounce the object. Such real-time processing and presentation of a simplistic go/no-go indicator allows the user to make informed decisions on whether to assume the peril of renunciation and continue to include the object in the resource event, forego including the object in the resource event or determining other object(s) more suited to the user (i.e., object(s) that the user are less likely or unlikely to renounce post-resource event).

A system for determining a likelihood of object renunciation by a user prior to conducting a resource event defines first embodiments of the system. The system includes a first computing platform having a first memory and one or more first processing devices in communication with the first memory. The first memory stores a first application that is executable by the one or more first processing devices. The first application is configured to receive object-identifying data associated with an object that a user is considering for inclusion in a resource event, and, in response to receiving the object-identifying data, compile user data from the first application and at least one of one or more second applications and one or more services stored within the first memory or executing on the first computing platform. The first application is further configured to communicate the object-identifying data and the user data to a network-based computing platform.

The system further includes the network-based computing platform having a second memory and one or more second processing devices in communication with the second memory. The second memory stores a distributed computing data mining engine and a statistical computing engine that are executable by the one or more second processing devices. The distributed computing data mining engine is configured to receive the object-identifying data and the user data communicated from the first application, and conduct a plurality of data mining searches of big data sources to extract data keyed to at least one of the user data and the object-identifying data. The statistical computing engine is configured to determine, based at least on (i) the extracted data, (ii) the user data and (iii) the object-identifying data, a go/no-go indicator that indicates one of the user is (a) likely to renounce the object post-resource event, or (b) unlikely to renounce the object post-resource event. The second computing platform is further configured to communicate the go/no-go indicator to the first application, which in response to receiving the go/no-go indicator and presents, within a user interface, an indication that either the user is (a) likely to renounce the object post-resource event, or (b) unlikely to renounce the object post-resource event.

In specific embodiments of the system, the first computing platform is a mobile communication device including an image-capturing device in communication with at least one of the one or more processing devices. In such embodiments of the system, the first application is further configured to receive the object-identifying data associated with the object by (i) capturing, with the image-capturing device, an image of an object-identifying code provided on the object or a container containing the object and (ii) reading the object-identifying code.

In other specific embodiments of the system, the first application is a widget embedded within a web browser application.

In further specific embodiments of the system, the distributed computing data mining engine is configured to conduct the plurality of data mining searches of big data sources to extract data keyed to at least one of the user and the object, such that each of the plurality of data mining searches is associated with one of a plurality of metrics for determining a likelihood of post-resource event object renunciation. In related embodiments of the system, the statistical computing engine is configured to (i) determine, based on the extracted data, a quantifiable indicator for each of the plurality of metrics, (ii) weight each of the quantifiable indicators based on relevance to likelihood renounce the object post-resource event, (iii) determine, based on each of the weighted quantifiable indicators, an overall quantifiable indicator of the likelihood of the user to renounce the object post-resource event, and (iv) implement the overall quantifiable indicator in the statistical computation determine the go/no-go indicator.

In still further specific embodiments of the system, the second memory of the network-based computing platform further stores an Artificial Intelligence (AI)-based machine-learning engine, executable by the one or more second processing devices and configured to machine learn, over time, from results of previous determinations of the likelihood of post-resource event object renunciation associated with the object or the user, and communicate an output of the machine-learning to the statistical computing engine, wherein the output of the machine-learning defines a confidence level.

Moreover, in additional specific embodiments of the system, the second memory of the network-based computing platform further stores a charting and presentation engine that is executable by the one or more second processing devices. The charting and presentation engine is configured to construct at least one of one or more back-up data charts and presentations that provide back-up data used in determining the go/no-go indicator that indicates one of the user is (a) likely to renounce the object post-resource event, or (b) unlikely to renounce the object post-resource event, and communicate the at least one of one or more back-up charts and presentations to the first computing platform.

An apparatus for determining a likelihood of object renunciation by a user prior to conducting a resource event defines second embodiments of the invention. The apparatus includes a computing platform including a memory and one or more processing devices in communication with the memory. The memory stores a distributed computing data mining engine, executable by the one or more processing devices and configured to receive object-identifying data and user data communicated from a first application, and conduct a plurality of data mining searches of big data sources to extract data keyed to at least one of the user data and the object-identifying data. Additionally, the memory stores a statistical computing engine that is executable by the one or more processing devices and configured to determine, based at least on (i) the extracted data, (ii) the user data and the (iii) object-identifying data, a go/no-go indicator that indicates one of the user is (a) likely to renounce the object post-resource event, or (b) unlikely to renounce the object post-resource event, and communicate the go/no-go indicator to the first application.

In specific embodiments of the apparatus, the first application is one selected from the group consisting of (i) a mobile communication device application, and (ii) a widget embedded in a web browser.

In other specific embodiments of the apparatus, the distributed computing data mining engine is configured to conduct the plurality of data mining searches of big data sources to extract data keyed to at least one of the user data and the object-identifying, such that each of the plurality of data mining searches is associated with one of a plurality of metrics for determining likelihood of post-resource event object renunciation. In related embodiments of the apparatus, the statistical computing engine is configured to (i) determine, based on the extracted data, a quantifiable indicator for each of the plurality of metrics, (ii) weight each of the quantifiable indicators based on relevance to likelihood renounce the object post-resource event, (iii) determine, based on each of the weighted quantifiable indicators, an overall quantifiable indicator of the likelihood of the user to renounce the object post-resource event, and (iv) implement the overall quantifiable indicator in the statistical computation determine the go/no-go indicator.

In still further embodiments of the apparatus, the memory of the computing platform further stores an Artificial Intelligence (AI)-based machine-learning engine, executable by the one or more processing devices and configured to machine-learn, over time, from results of previous determinations of the likelihood of post-resource event object renunciation associated with the object or the user. In such embodiments of the apparatus, the statistical computing engine is further configured to determine, based further on (iv) an output of the machine-learning, the go/no-go indicator. The output of the machine-learning defining a confidence level.

In additional specific embodiments of the apparatus, the memory of the computing platform further stores charting and presentation engine that is executable by the one or more processing devices and configured to construct at least one of one or more back-up data charts and presentations that provide back-up data used in determining the go/no-go indicator that indicates one of the user is (a) likely to renounce the object post-resource event, or (b) unlikely to renounce the object post-resource event, and communicate the at least one of one or more back-up charts and presentations to the first application.

A computer-implemented method for determining a likelihood of object renunciation by a user prior to conducting a resource event defines third embodiments of the invention. The method is executed by one or more computing processor devices. The method includes receiving, at a first application, object-identifying data associated with an object that a user is considering for inclusion in a resource event. Additionally, the method includes, in response to receiving the object-identifying data, compiling user data from the first application and at least one of one or more second applications and one or more services stored within or network-accessible to a computing platform executing the first application. Further, the method includes conducting, via a distributed computing network, a plurality of data mining searches of big data sources to extract data keyed to at least one of the user data and the object-identifying data. In addition, the method includes determining, using a statistical computing engine and based at least on (i) the extracted data, (ii) the user data and (iii) the object-identifying data, a go/no-go indicator that indicates one of the user is (a) likely to renounce the object post-resource event, or (b) unlikely to renounce the object post-resource event and presenting the go/no-go indicator on the first application.

In specific embodiments of the computer-implemented method, receiving further includes receiving, at the first application executing on a mobile communication device, the object-identifying data associated with an object that a user is considering for inclusion in a resource event. In such embodiments of the computer-implemented method, receiving further comprises capturing, at the mobile communication device, an image of an object-identifying code provided on the object or a container containing the object and reading the object-identifying code.

In other specific embodiments of the computer-implemented method, receiving further comprises receiving, at the first application defined as a widget embedded in a web browser, object-identifying data associated with an object that a user is considering for inclusion in a resource event.

In other specific embodiments of the computer-implemented method conducting the plurality of data mining searches of big data sources further includes conducting the plurality of data mining searches of big data sources to extract data keyed to at least one of the user data and the object-identifying, such that each of the plurality of data mining searches is associated with one of a plurality of metrics for determining likelihood of post-resource event object renunciation. In related embodiments of the computer-implemented method, determining the go/no-go indicator further includes (i) determining, based on the extracted data, a quantifiable indicator for each of the plurality of metrics, (ii) weighting each of the quantifiable indicators based on relevance to likelihood renounce the object post-resource event (iii) determining, based on each of the weighted quantifiable indicators, an overall quantifiable indicator of the likelihood of the user to renounce the object post-resource event, and (iv) implementing the overall quantifiable indicator in the statistical computation determine the go/no-go indicator.

Moreover, in further specific embodiments the method further includes machine-learning, over time, from results of previous determinations of the likelihood of post-resource event object renunciation associated with the object or the user. In such embodiments of the computer-implemented method, determining further includes determining, based further on (iv) an output of the machine-learning, the go/no-go indicator. The output of the machine-learning defines a confidence level.

Thus, systems, apparatus, methods, and computer program products herein described in detail below provide for leveraging big data searches, statistical computation and artificial intelligence to determine the likelihood that a user will renounce an object post-resource event. Specifically, the present invention relies on object-identifying data and user data to key a plurality of data mining searches of big data sources. In response to extracting responsive data from the big data sources, the present invention implements statistical computing to determine a go/no-go indicator that indicates either that (i) the user is unlikely to renounce (i.e., abandon, fail to use and/or return) the object post-resource event, or (ii) the user is likely to renounce (i.e., abandon, fail to use and/or return) the object post-resource event. In additional embodiments of the invention, Artificial Intelligence (AI) is used to analyze previous likelihood of renunciation determinations to determine a confidence level which is used in the statistical computation of the go/no-go indicator.

BRIEF DESCRIPTION OF THE DRAWINGS

Figure 1:
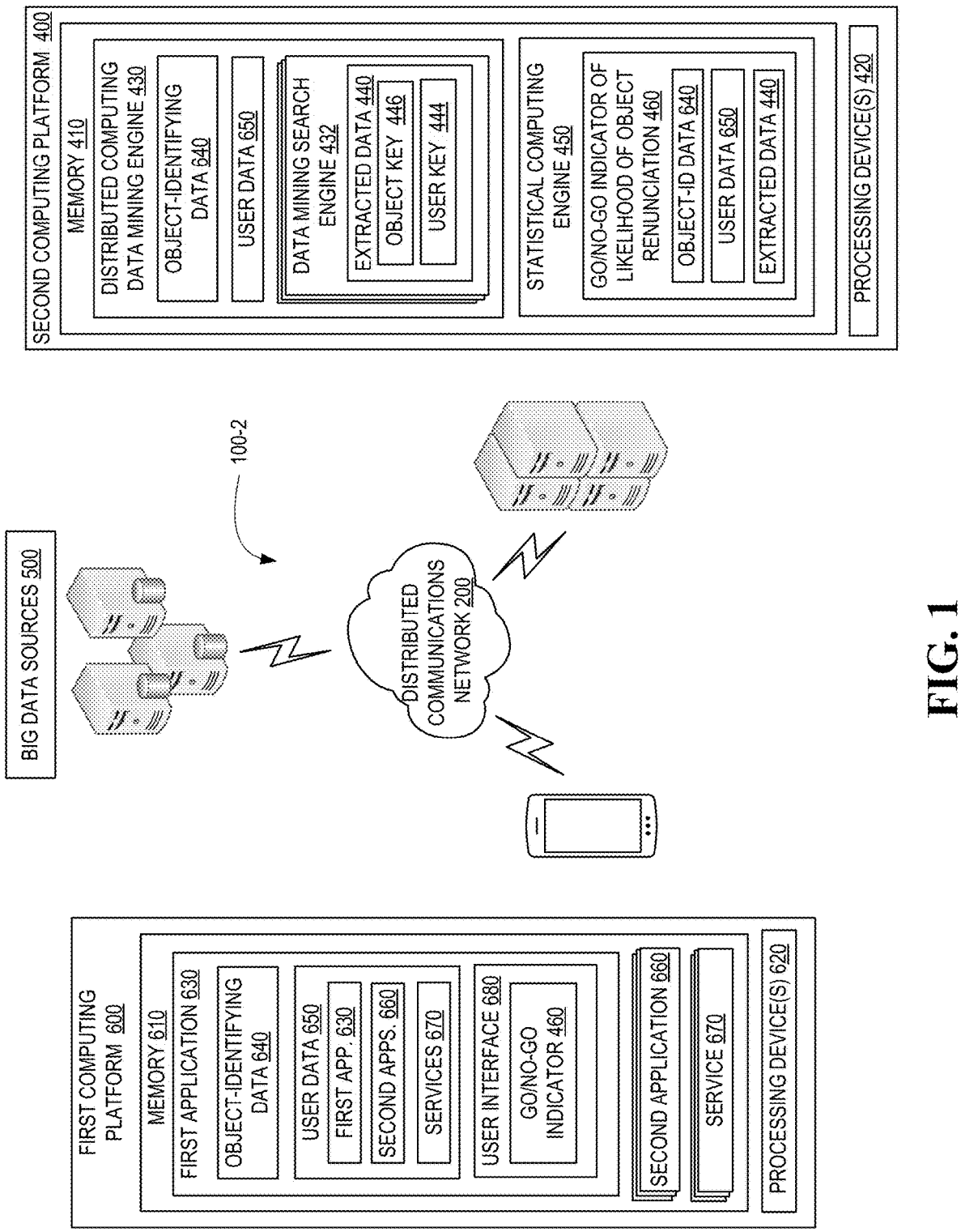
Figure 2:
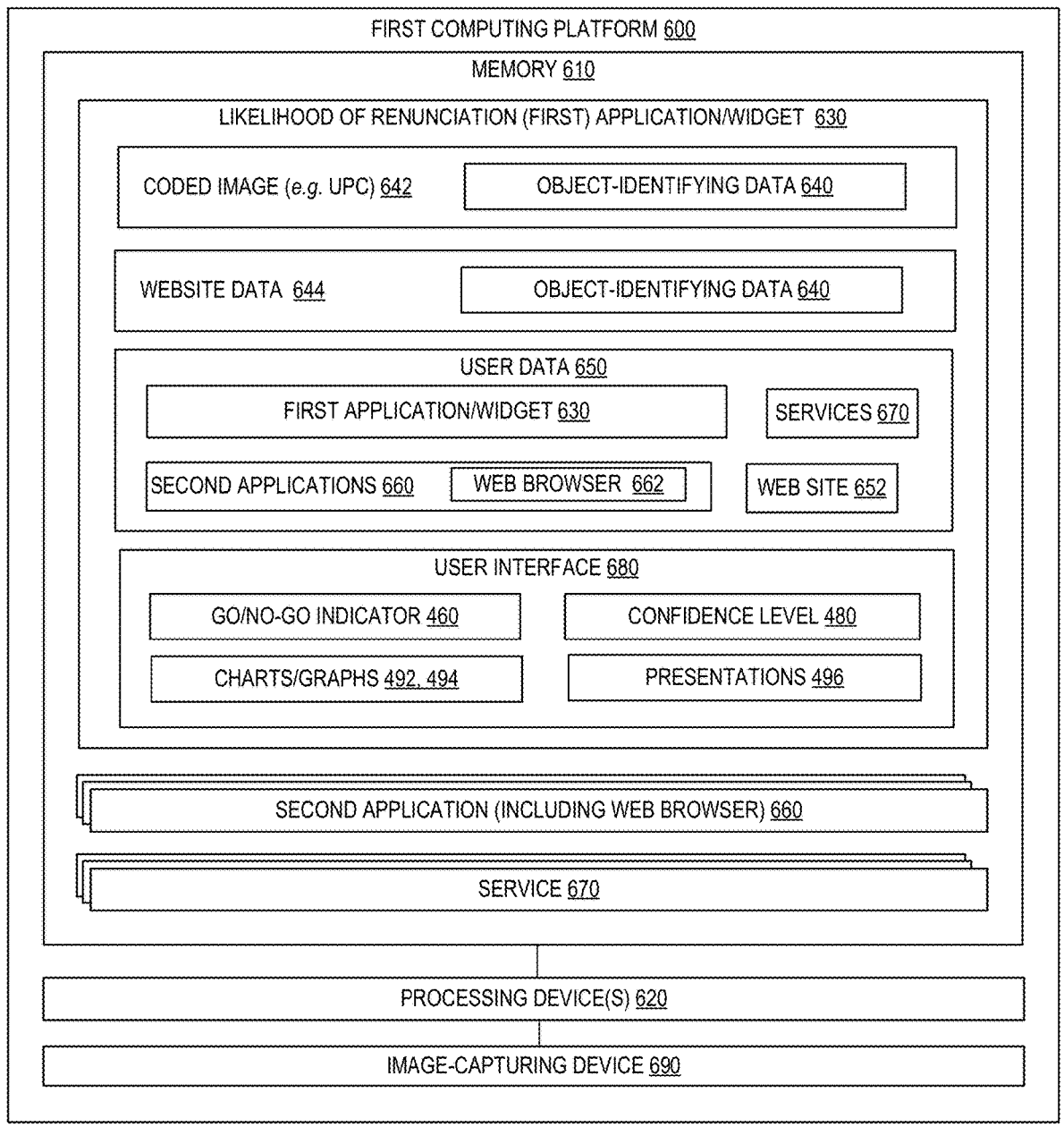
Figure 3:
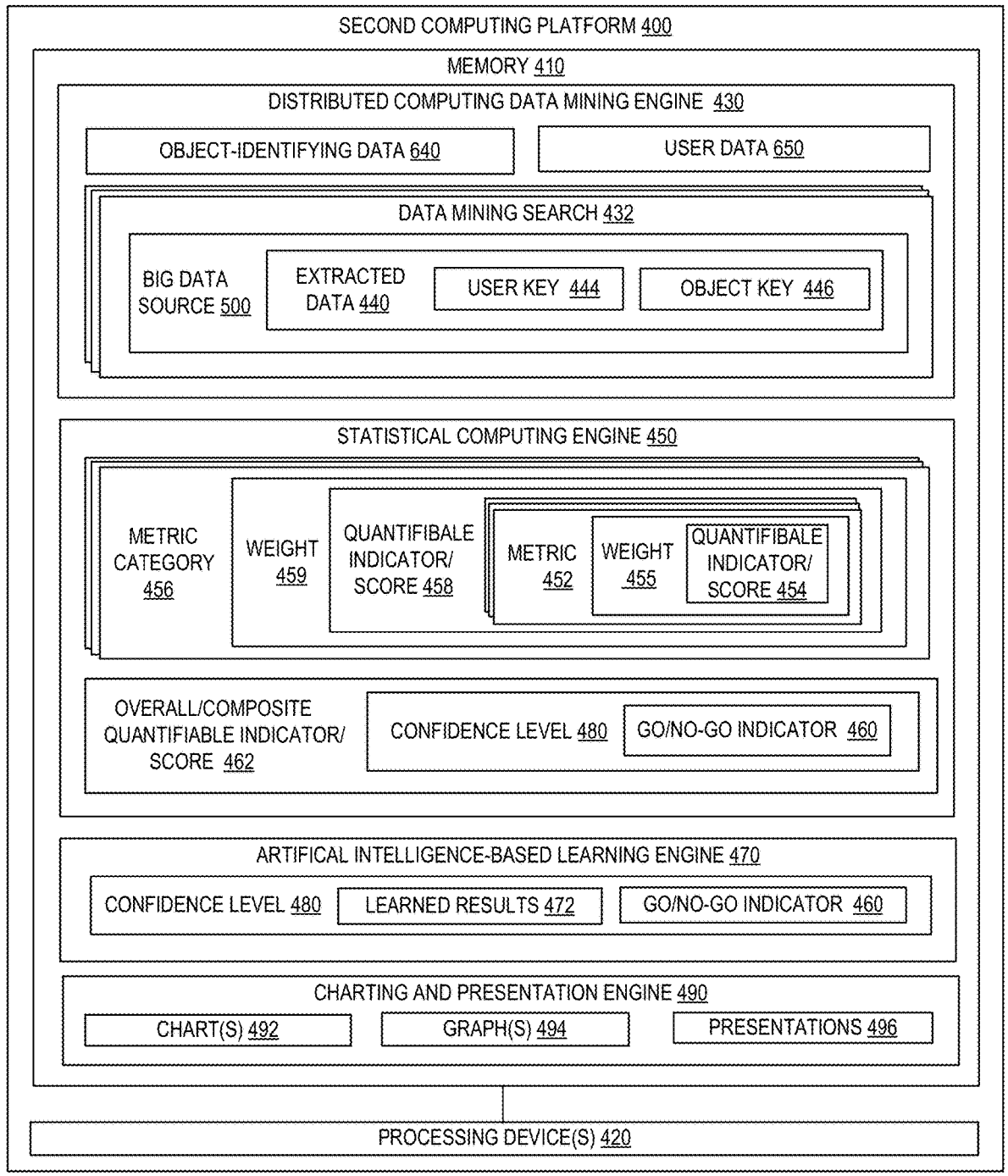
Figure 4:
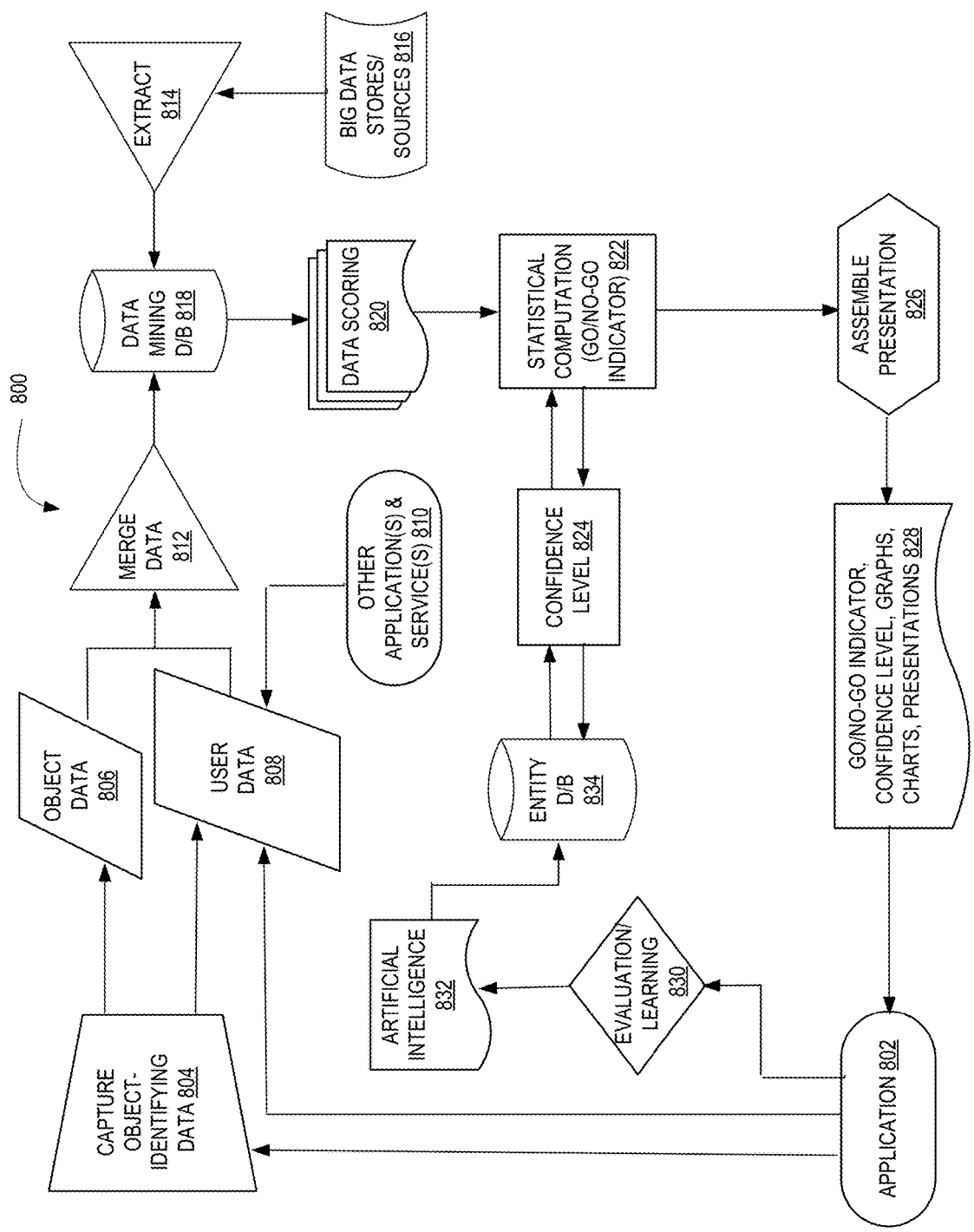
Figure 5:
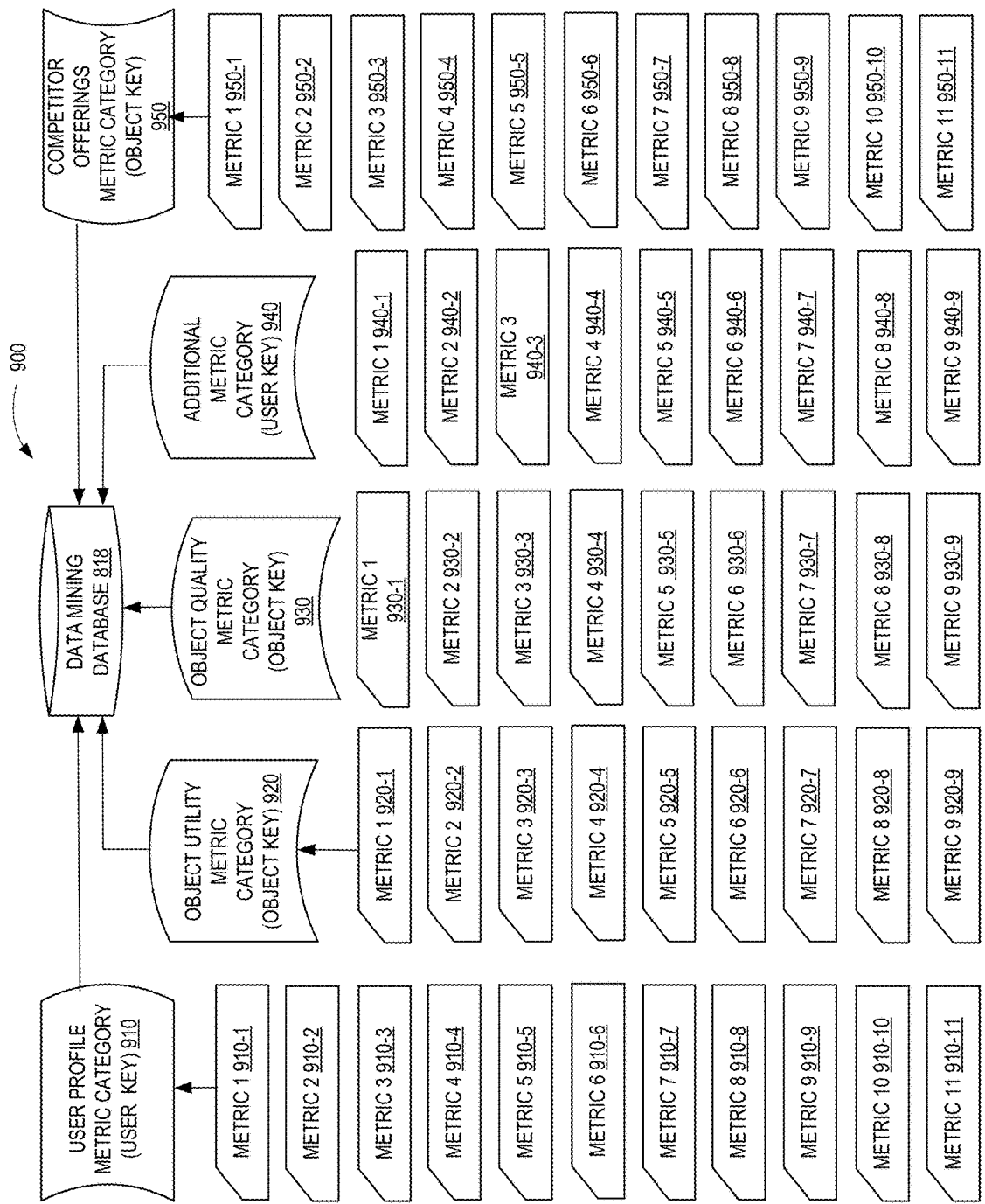
Figure 6:
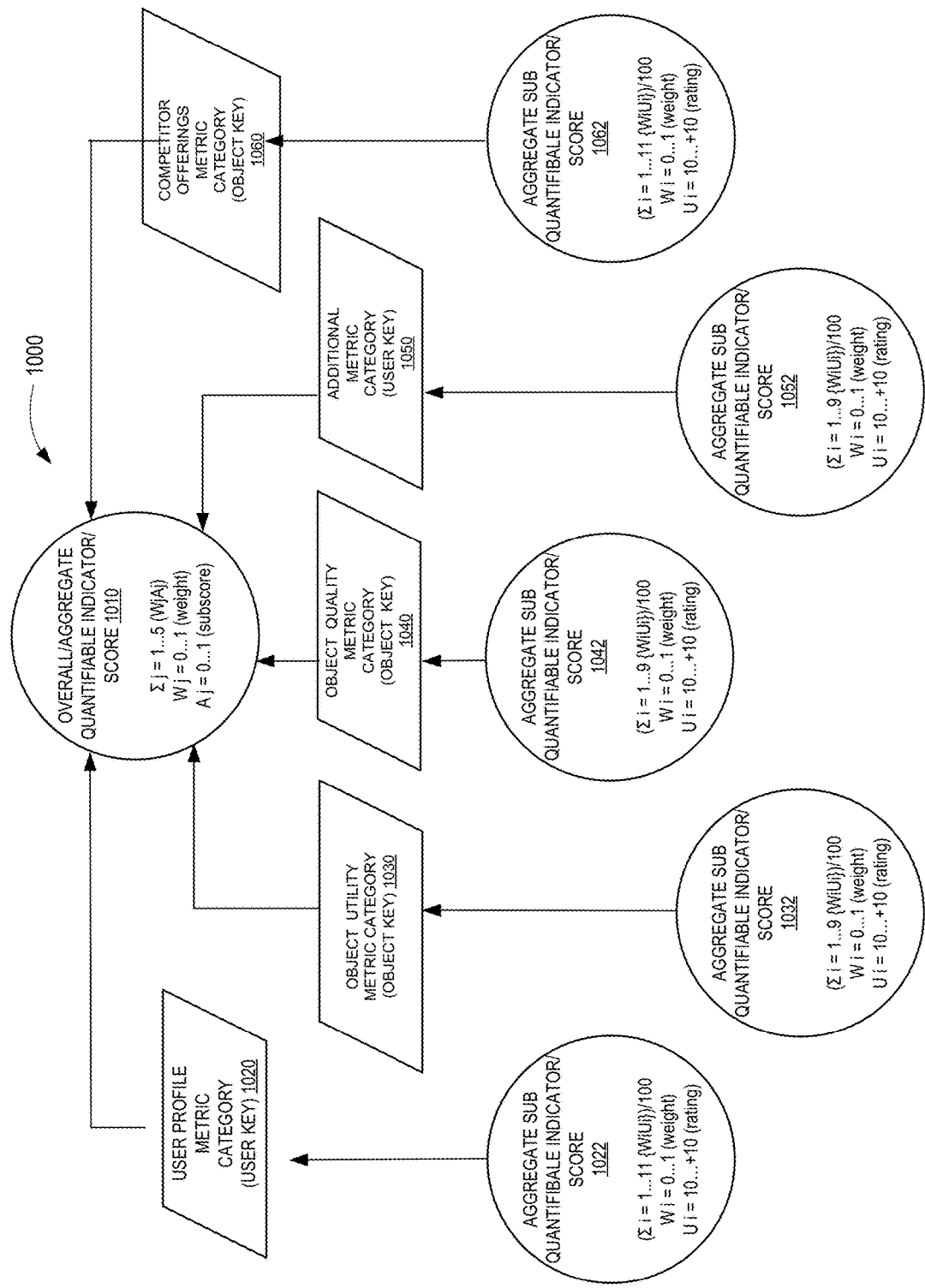
Figure 7:
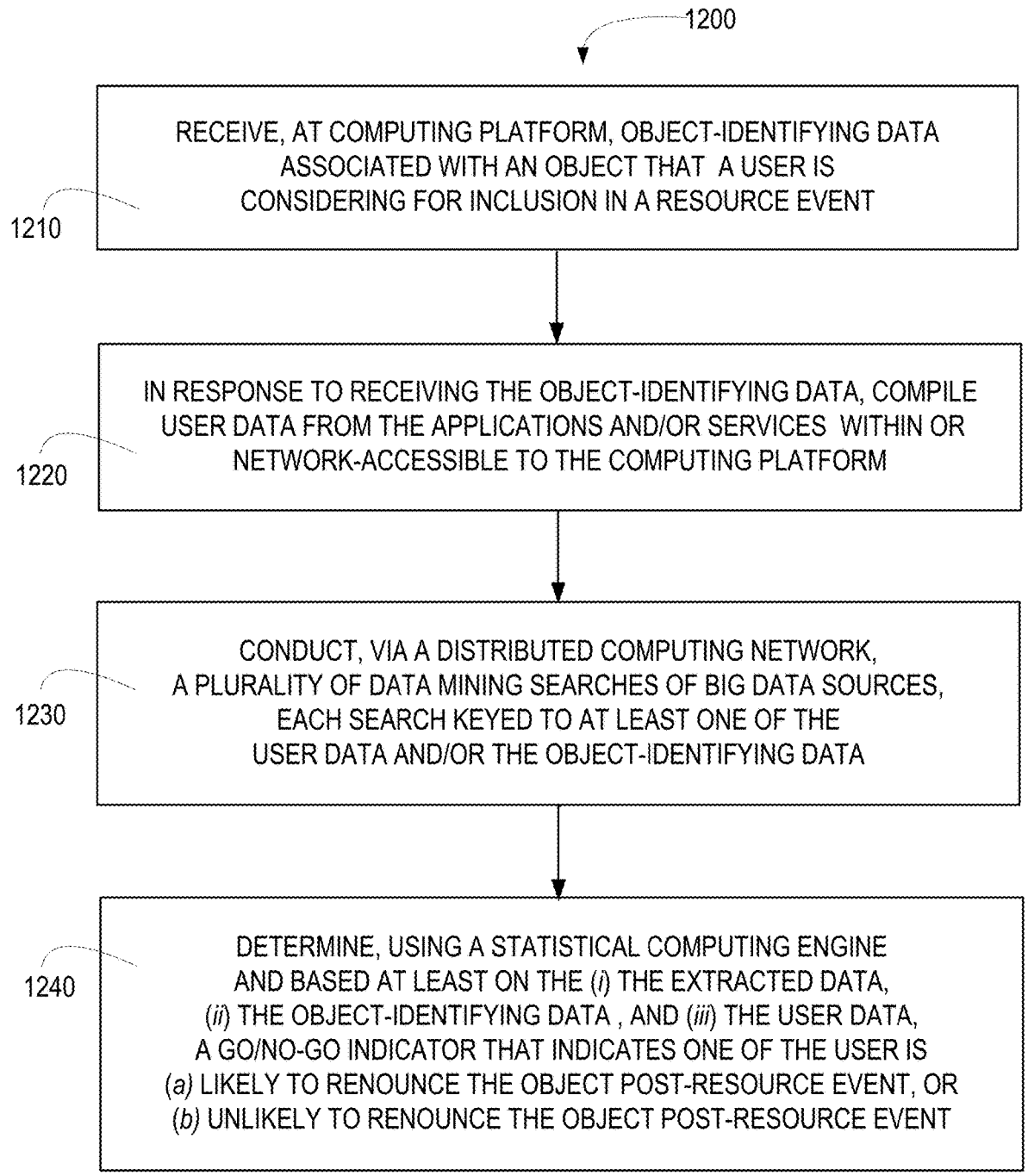

Having thus described embodiments of the invention in general terms, reference will now be made the accompanying drawings, wherein:

FIG. 1 is a schematic/block diagram of a system for determining a likelihood of post-resource event object renunciation by a user prior to conducting a resource event, in accordance with embodiments of the present invention;

FIG. 2 is a flow diagram of computing platform including a first application/widget for determining a likelihood of post-resource event object renunciation by a user prior to conducting a resource event, in accordance with embodiments of the present invention;

FIG. 3 is block diagram of a computing platform including data mining search engine and a statistical computing engine, in accordance with embodiments of the present invention;

FIG. 4 is a flow diagram of a comprehensive method for determining a likelihood of post-resource event object renunciation by a user prior to conducting a resource event, in accordance with embodiments of the present invention;

FIG. 5 is a schematic diagram highlighting a data mining process, in accordance with embodiments of the present invention;

FIG. 6 is a schematic diagram highlighting a process for determining a go/no-go indicator; in accordance with embodiments of the present invention; and FIG. 7 is a flow diagram of a high-level method for determining a likelihood of post-resource event object renunciation by a user prior to conducting a resource event, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for leveraging big data searches, statistical computation and machine-learning/AI to determine the likelihood that a user will renounce an object, such as a product, post-resource event, such as after a payment transaction or the like. Specifically, the present invention relies on object/product-identifying data and user data to key a plurality of data mining searches of big data sources. In response to extracting responsive data from the big data sources, the present invention implements statistical computing to determine a go/no-go indicator (e.g., a so-called "sticky bit value" of "0" or "1") that indicates either that (i) the user is unlikely to renounce (i.e., abandon, fail to use and/or return) the object/product post-resource event/payment transaction, or (ii) the user is likely to renounce (i.e., abandon, fail to use and/or return) the object post-resource event. In additional embodiments of the invention, Artificial Intelligence (AI) is used to analyze previous likelihood of renunciation determinations to determine a confidence level which is used in the statistical computation of the go/no-go indicator.

In a specific use case a mobile communication device stores an application, i.e., and "app" that allows for users to capture a coded image (e.g., Universal Product Code (UPC)) or the like, which, when read, serves as the object-identifying data and, subsequently, user data is acquired from the app and/or other apps and services stored or executing or the mobile communication device. In another specific use case, a widget is embedded in a web browser, such that as the user browses objects on a web sites or places objects in an electronic cart, the user is provided an option as to whether they would like determine the likelihood of renunciation of the object. In such embodiments of the invention, the website provides the widget with the object-identifying data and the user data is provided by the widget or other applications or services executing and/or stored on the Internet-enabled computing device.

Once the mobile device has captured the image of the code or the widget has identified the object, real-time processing ensuing in which a determination is made to likeliness of object renunciation and, in response, the app presents the user with the appropriate go/no-indicator indicating either that (i) the user is unlikely to renounce the object, or (ii) the user is likely to renounce the object. Such real-time processing and presentation of a simplistic go/no-go indicator allows the user to make informed decisions on whether to assume the peril of renunciation and continue to include the object in the resource event, forego including the object in the resource event or determining other object(s) more suited to the user (i.e., object(s) that the user are less likely or unlikely to renounce post-resource event).

Turning now to the figures, Referring to FIG. 1, illustrates a system 100 for determining a likelihood of post-acceptance renunciation of object that a user is considering for inclusion in a resource event, in accordance with embodiments of the present invention. As previously discussed, the object may be any product or the like offered by an entity, such as a merchant or the like. Post-acceptance renunciation also commonly referred to as "buyer's remorse", may result in the user rejecting or failing to use the product and/or returning the product to the merchant. The present invention makes a determination of the likelihood of renunciation for the benefit of the user (e.g., prospective customer) who is considering whether to include the object in a resource event (e.g., a product included in a sales transaction or the like) so that the user can make informed decisions on whether they are prone to use/benefit from the object/product or whether they are prone to not use/benefit from the product and/or return the object/product to the entity/merchant. As such, the process of the presently described embodiment of the invention is typically undertaken prior to the user conducting a resource event/sales transaction, such as when the user is shopping physically at a merchant location or electronically at merchant website.

The system includes a first computing platform 600 and a network-based/second computing platform 400 that is in network communication with the first computing platform 600 via distributed communications network 200, which may include the Internet, one or more intranets, one or more cellular networks or the like.

First communication platform 600 includes a memory 610 and at least one processing device 620 in communication with the memory 610. In this regard, first computing platform 600 may comprise one or more computing devices, such as a mobile communication device (e.g., mobile smartphone or the like), desktop/personal computers (PCs), laptop computers, tablet computing devices or the like in possession or otherwise used by the user considering who is contemplating inclusion of an object/product in a resource event/sales transaction or the like.

Memory 610 stores first application 630 that is configured to determine the likelihood of a user renouncing, post-acceptance/acquisition, an object that the user is considering for inclusion in a resource event. In those embodiments of the invention in which the first computing platform 600 is a mobile communication device, first application may be a stand-alone "app" stored on the mobile communication device that is used when a user is physically located at a merchant location. In other embodiments of the invention in which the first computing platform 600 is a PC, laptop, tablet or mobile communication device, the first application 300 may be a widget that is embedded within an Internet web browser application. In such applications the widget may be invoked when a user browses objects/products at a merchant website or otherwise places objects/products in an electronic cart at a merchant's website.

First application 330 is configured to receive object-identifying data 640 associated with an object/product that the user is considering for inclusion in a resource event/transaction. In specific embodiments of the invention, in which the first application is a standalone application within a mobile communication device, the first application may utilize an image-capturing device within the mobile communication device to capture an image of a code (e.g., Universal Product Code (UPC) or the like) that, when read, provides the object-identifying data 640. In other embodiments of the invention, in which the first application is a widget, the widget may receive the object-identifying data 640 from the merchant website as the user browses objects/products within the website or when the user places an object/product in the electronic cart associated with the merchant website. In still further embodiments of the invention, the user may manually enter inputs into the first application 610 that provide the requisite object-identifying data 640.

In response to receiving the object-identifying data 640, first application 630 is configured to compile user data 650 from the first application or, as authorized by the user in configuring the first application 630, from other second applications 660 and/or services 670 stored, accessible to or executing on the first computing platform 600. In specific embodiments of the invention, in which the first application 630 is a widget, the widget may compile user data from the web browser and/or the merchant website.

Network-based/second computing platform 400 includes memory 410 stores distributed computing data mining engine 430 that is configured to receive the object-identifying data 640, the user data 650 and conduct a plurality of data mining searches 432 of big data sources 500 to extract relevant data 440. As discussed infra. each of the plurality of searches are related to one of a plurality of search categories and keyed to at least one of the object (i.e., object key 446) or the user (i.e., user key 444).

Memory 410 additionally stores statistical computing engine 450, which may comprise a combination of R programming language modules for statistical computing and presentation. Statistical computing engine 450 is configured to determine, based at least on the extracted data 440, the object-identifying data 640 and the user data 650, a go/no-go indicator 460, a so-called "sticky bit value", that indicates one of (i) the user is likely to renounce the object post-resource event or (ii) the user is unlikely to renounce the object post-resource event. Once the statistical computing engine 450 has determined the go/no-indicator 460, and, in some embodiments of the invention as discussed infra., other presentation information, charts, graphs or the like, the go/no-indicator 460 and, in some embodiments of the invention, any further presentation/chart/graph data is communicated to the first application 630 via a distributed communication network 200.

First application 630 is further configured to receive the go/no-indicator 460 and, in some embodiments of the invention, any other presentation/chart/graph data and present the go/no-indicator 460 to the user via one or more user interfaces 380. By rendering a simplistic go/no-go indicator 460 and presenting the same to the user, the present invention is able to provide the user an easily comprehensible definitive indication of the user's likelihood of renouncing an object/product post-resource event/transaction. In the event that the user has been determined as likely to renounce the object, the user may choose to accept the peril and include the object/product in a resource event/sales transaction, forego inclusion of the object/product in the resource event/sales transaction or contemplate a different object/product for inclusion in the resource event/sales transaction (i.e., an object/product that undergoes the aforementioned process and results in a determination that the user is unlikely to renounce the object/product post-resource event/sales transaction).

Referring to FIG. 2, a block diagram is depicted of a first computing platform 600 used in conjunction with the system 100 depicted and described in relation to FIG. 1. The computing platform 600 which may comprise one or more devices (e.g., mobile communication device, PC, laptop, tablet, or the like), is configured to execute software programs, including engines, instructions, algorithms, modules, routines, applications, tools and the like. Computing platform 600 includes memory 610 and the like which may comprise volatile and non-volatile memory, such as read-only and/or random-access memory (RAM and ROM), EPROM, EEPROM, flash cards, or any memory common to computing platforms). Moreover, memory 610 and the like may comprise cloud storage, such as provided by a cloud storage service and/or a cloud connection service.

Further, first computing platform 600 also includes at least one processing device 620, which may be an application-specific integrated circuit ("ASIC"), or other chipset, logic circuit, or other data processing device configured to execute stored software/firmware including first application/widget 630 or the like. Processing device(s) 620 or the like may execute one or more application programming interface (APIs) (not shown in FIG. 2) that interface with any resident programs, such as first application 630 or the like stored in the memory 610 of the computing platform 600 and any external programs. Processing device(s) 620 may include various processing subsystems (not shown in FIG. 2) embodied in hardware, firmware, software, and combinations thereof, that enable the functionality of first computing platform 600 and the operability of first computing platform 600 on distributed communications network 200 (shown in FIG. 1). For example, processing subsystems allow for initiating and maintaining communications and exchanging data with other networked devices, such as second computing platform 400 (shown in FIG. 1). For the disclosed aspects, processing subsystems of first computing platform 600 may include any processing subsystem used in conjunction with first application 630 and related engines, tools, routines, sub-routines, algorithms, sub-algorithms, sub-modules thereof.

First computing platform 600 additionally includes a communications module (not shown in FIG. 2) embodied in hardware, firmware, software, and combinations thereof, that enables electronic communications between first computing platform 600 and other network devices, such as, but not limited to, second computing platform 600. Thus, communication module may include the requisite hardware, firmware, software and/or combinations thereof for establishing and maintaining a network communication connection with one or more network devices.

Memory 630 stores first application 630, which, as described in relation to FIG. 2, is configured to receive object-identifying data 640 associated with an object/product that the user is considering for inclusion in a resource event/transaction. In specific embodiments of the invention, in which the first application 630 is a standalone application within a mobile communication device, the first application 630 may utilize an image-capturing device 690 within the mobile communication device to capture a coded image 642 (e.g., Universal Product Code (UPC) or the like) that, when read, provides the object-identifying data 640. In other embodiments of the invention, in which the first application 630 is a widget, the widget may receive the object-identifying data 640 as website data 644 from the merchant website as the user browses objects/products within the website or when the user places an object/product in the electronic cart associated with the merchant website. In still further embodiments of the invention, the user may manually enter inputs into the first application 610 that provide the requisite object-identifying data 640.

In response to receiving the object-identifying data 640, first application 630 is configured to compile user data 650 from the first application 630 and, as authorized by the user in configuring the first application 630, from other/second applications 660, and/or services 670 stored, accessible to or executing on the first computing platform 600. In specific embodiments of the invention, in which the first application 630 is a widget, the widget may compile user data 650 from the widget and, as authorized by the user in configuring the widget, other/second applications 670 including the web browser 662 and/or the merchant website 652.

In response to receiving the object-identifying data 640 and compiling the user data 650, first application 330 is configured to communicate the object-identifying data 640 and the user data 650 to the network-based computing platform 400.

In response to the network-based computing platform 400 performing requisite big data searches and implementing statistical computing to determine the go/no-go indicator 460, the first application 330 is configured to receive and present the go/no-go indicator 460 and, in some embodiments, chart(s)/graph(s) 492, 494 and presentation(s) 496 via one or more user interfaces 680 of the first application 630.

Referring to FIG. 3, a block diagram is depicted of a second computing platform 400 used in conjunction with the system 100 depicted and described in relation to FIG. 1. Second computing platform 400 which may comprise one or more devices (e.g., application servers, or the like), is configured to execute software programs, including engines, instructions, algorithms, modules, routines, applications, tools and the like. Second computing platform 400 includes memory 410 and the like which may comprise volatile and non-volatile memory, such as read-only and/or random-access memory (RAM and ROM), EPROM, EEPROM, flash cards, or any memory common to computing platforms). Moreover, memory 410 and the like may comprise cloud storage, such as provided by a cloud storage service and/or a cloud connection service.

Further, second computing platform 400 also includes at least one processing device 420, which may be an application-specific integrated circuit ("ASIC"), or other chipset, logic circuit, or other data processing device configured to execute stored software/firmware including distributed computing data mining engine 430, statistical computing engine 450, AI-based machine-learning engine 470 and charting and presentation engine 490 or the like. Processing device(s) 420 or the like may execute one or more application programming interface (APIs) (not shown in FIG. 3) that interface with any resident programs, such as distributed computing data mining engine 430, statistical computing engine 450, AI-based machine-learning engine 470 and charting and presentation engine 490 or the like stored in the memory 410 of the second computing platform 400 and any external programs. Processing device(s) 420 may include various processing subsystems (not shown in FIG. 3) embodied in hardware, firmware, software, and combinations thereof, that enable the functionality of second computing platform 400 and the operability of second computing platform 400 on distributed communications network 200 (shown in FIG. 1). For example, processing subsystems allow for initiating and maintaining communications and exchanging data with other networked devices, such as first computing platform 600 (shown in FIG. 1). For the disclosed aspects, processing subsystems of second computing platform 400 may include any processing subsystem used in conjunction with distributed computing data mining engine 430, statistical computing engine 450, AI-based machine-learning engine 470 and charting and presentation engine 490 and related engines, tools, routines, sub-routines, algorithms, sub-algorithms, sub-modules thereof.

Second computing platform 400 additionally includes a communications module (not shown in FIG. 3) embodied in hardware, firmware, software, and combinations thereof, that enables electronic communications between second computing platform 400 and other network devices, such as, but not limited to, first computing platform 600. Thus, communication module may include the requisite hardware, firmware, software and/or combinations thereof for establishing and maintaining a network communication connection with one or more network devices.

The memory 410 of second computing platform 400 stores distributed computing data mining engine 430 which is configured to receive the object-identifying data 640 and the user data 650 from the first computing platform. The user data 650 includes the data received in the first application 330, as well as, other user data stored by or accessible to first computing platform 300.

Data mining engine 430 is further configured to conduct a plurality of data mining searches 432 of big data sources 500 to extract relevant data 440. Each of the plurality of searches are related to one of a plurality of metric categories and keyed to at least one of the object (i.e., object key 446) or the user (i.e., user key 444). For example, in specific embodiments of the invention, the metric categories 456 may include, but are not limited to, user attribute metric category, object utility metric category, object quality metric category, competitor offering metric category and additional metric category. In such embodiments of the invention, in metric category 456 has a plurality of metrics 452 that are searchable within the big data sources 500. FIG. 5 described infra., highlights use of metric categories and associated metrics.

Memory 410 additionally stores statistical computing engine 450, which may comprise a combination of R programming language modules for statistical computing and presentation. Statistical computing engine 450 is configured to determine, based at least on (i) the extracted data 440, (ii) the object-identifying data 640 and (iii) the user data 650, a go/no-go indicator 460, a so-called "sticky bit value", that indicates one of (i) the user is likely to renounce the object post-resource event, or (ii) the user is unlikely to renounce the object post-resource event.

In specific embodiments of the invention the statistical computing engine 450 or, in some embodiments a scoring engine, is configured to determine quantifiable indicators/scores 454 for each metric 452 and assign a weight 455 to each quantifiable indicator/score 454 based on the predetermined significance of the metric 452 in determining a likelihood of renunciation. Further, the statistical computing engine 450 or scoring engine is configured to sum the weighted quantifiable indicators 454 of each of the metrics within a corresponding metric category 456 to result in a category quantifiable indicator/score 458 and assign a weight 459 to each category quantifiable indicator/score 458 based on the predetermined significance of the metric category 456 in determining a likelihood of renunciation. Subsequently each of the weighted category quantifiable indicators/scores are summed to result in an overall/comprehensive quantifiable indicator/score 462.

In further specific embodiments of the invention, the statistical computing engine 450 is configured to determine the go/no-go indicator 460 based on the overall/comprehensive quantifiable indicator/score 462 and, in some embodiments a confidence level 480. The confidence level 480 is determined by Artificial Intelligence (AI)-based machine learning engine 470 that is configured to machine learn from previous likelihood of renunciation determinations and apply the results 472 of the machine-learning to determine a confidence level 480 for the currently determined overall/comprehensive quantifiable indicator/score 462.

Additionally, memory 410 of second computing platform 400 stores charting and presentation engine 490 that is configured to construct charts 492, graphs 494 and/or presentations 496 that provide back-up/supplementary data that allows the entity insight into how and why the go/no-go indicator 460 was determined.

Referring to FIG. 4, a flow diagram is depicted of a methodology for determining a likelihood of post-resource event renunciation of object that a user is considering for inclusion in a resource event, in accordance with embodiments of the present invention. At Start 702, an application is launched. The application may be an application on a mobile communication device specifically suited for determining a likelihood of post-resource event renunciation of object or the application may be a widget embedded in a web browser for determining a likelihood of post-resource event renunciation of object that the user is considering for inclusion in an online resource event/transaction.

At Event 804, object-identifying data 806 is captured. For mobile applications, capturing of the object-identifying data 806 may include, implementing an image-capturing device (e.g., camera) to capture a coded-image, such as a UPC or the like and reading the object-identifying data to identifying the object/product of interest. For example, a user located within a physical merchant site may capture the UPC code of a desired object/product to determine whether or not the user will use the object/product or experience "buyer's remorse" and return the object/product to the entity/merchant. For widgets, capturing of the object-identifying data may include receiving object-identifying from the merchant website in response to the user performing a predetermined action (e.g., hovering over an object/product for a predetermined period of time or performing some other selection process, such as placing the object/product within an electronic shopping cart or the like).

At Event 808 user data is compiled from the application and, in some embodiments, from other applications & services 810 stored, accessible or executing on the computing platform. In specific embodiments the user may configure the applications to allow for the use of other user data from the second applications or services. At Event 812, the object data 806 and the user data 808 is merged and communicated to the data mining engine.

At Event 814, data mining searches are undertaken to extract data from big data stores/sources 816 and stores the extracted data in data mining database 718. The searches are keyed to one of the user or the object. While processing speeds allow for data mining searches to be conducted in real-time to receiving the merged data (i.e., receiving the inputs at the application), it is possible to implement results from previously conducted data mining searches keyed to the object which can be stored in the data mining database 818 for a predetermined period of time.

At Event 820, data scoring is executed on the extracted data. In specific embodiments of the invention, each metric that is searched is defined a score and the score is weighted based on the significance of the metric in determining likelihood of renunciation. In additional embodiments of the invention, each metric belongs to one of a plurality of metric categories, such that the sum of the weighted scores of each metric in the category defines the category score, which is then weighted based on the significance of the category in determining likelihood of renunciation. In such embodiments, the sum of the weighted scores of each category defines a comprehensive/overall score (i.e., quantifiable indicator) associated with the likelihood of renunciation.

At Event 822, statistical computation is performed to determine the go/no indicator, i.e., a so-called "sticky bit value" based on the comprehensive/overall score (i.e., quantifiable indicator) determined in the previous data scoring event (720) and a confidence level 824 determined/rendered from AI-based machine-learning from previous likelihood of renunciation determinations associated with the same or similar object, the same user and/or other similarly situated users.

At Event 826, presentation(s), graph(s) and/or charts are constructed/assembled that provide back-up/support for the go/no-indicator (i.e., information that the entity can use to assess the logic used in determining the go/no-go indicator) and, at Event 828, the go/no-go indicator, along with any presentations, graphs and/or charts are communicated to the application where they are presented to the user on user interfaces. In response to receiving the go/no-go indicator, the user may decide to assume the peril and continue to include the object in a resource event/transaction, forego including the object in the resource event or identify other objects that the user is more likely to retain and/or utilize post-resource event.

At Event 830, evaluation of the results of the results of the determination process are undertaken and, at Event 832, Artificial Intelligence is implemented to learn from the results of the determination process. The overall learned results are stored in entity database 834 and are used in rendering a confidence level 824 for subsequent likelihood of renunciation determinations, which is used in the statistical computation 822 of subsequent go/no-go indicator determinations.

Referring to FIG. 5 a schematic diagram is presented of data mining 900 conducted for purposes of subsequently determining a likelihood of object renunciation, in accordance with embodiments of the present invention. In the example shown in FIG. 5, five metric categories are defined including (i) a user attribute metric category 910 keyed to the user; (ii) an object utility metric category 920 keyed to the object, (iii) an object quality metric category 930 keyed to the object, (iv) an additional metric category 940 keyed to the user, and (v) a competitor offerings metric category 950 keyed to the object.

Each of the metric categories have a plurality of metrics, for example, user attribute metric category 910 includes metrics 1-11 910-1-910-11, which may include, but are not limited to, metrics which may or may not have been captured by the application/widget 630. object utility metric category 920 includes metrics 1-9 920-1-920-9, which may include, but are not limited to, a volume of features metric, a long term benefit metric, simplistic function/design metric, accessibility metric, value add metric, tangible results metric, cross functionality metric, portability metric, key needs metric and the like. Object quality metric category 930 includes metrics 1-9 930-1-930-9, which may include, but are not limited to, a customer rating metric, a performance metric, functional attributes metric, reliability metric, availability metric, aesthetics metric, industry standards metric, novelty metric, uniqueness metric and the like. Additional metric category 920 includes metrics 1-9 940-1-940-9, which may include, but are not limited to, any other data that is relevant to gaining a better understanding of the user, including social media interaction and the like. Competitor offering metric category includes metrics 1-11 950-1-950-11, which may include, but are not limited to, similar product metric, encouragements/discount metric, brand appeal metric, market percentage metric, customer attention metric, user friendly metric, approval/acquisition process metric, metric and the like.

As previously discussed, once the searches are completed the results are stored in data mining database 718 for subsequent data scoring.

Referring to FIG. 6, a schematic diagram is presented of a methodology of data scoring, in accordance with embodiments of the present invention. Specifically, each of the metrics within one of the metric categories are provided a quantifiable indicator/score or rating that indicative of the data extracted from the big data sources as it pertains to likelihood of facility/service renunciation. A weighting value is then assigned to each of the quantifiable indicators/ scores or ratings and the weighted scores/ratings are summed and divided by one hundred to result in a metric category score. The weighting value corresponds to the significance of the metric as it pertains to determination of likelihood of facility/service renunciation. For example, user attribute metric category 910 provides for aggregating the eleven metrics 910-1-910-11 (shown in FIG. 5) to result in a user attribute metric category-specific quantifiable indicator/score 1010. Object utility metric category 920 provides for aggregating the nine metrics 920-1-920-9 (shown in FIG. 5) to result in an object utility metric category-specific quantifiable indicator/score 1020. Object quality metric category 930 provides for aggregating the nine metrics 930-1-930-9 (shown in FIG. 5) to result in an object quality metric category-specific quantifiable indicator/score 1030. Additional metric category 940 provides for aggregating the nine metrics 940-1-940-9 (shown in FIG. 5) to result in an additional metric category-specific quantifiable indicator/ score 1040. Competitor offerings metric category 950 provides for aggregating the eleven metrics 920-1-920-11 (shown in FIG. 5) to result in a competitor offering metric category-specific quantifiable indicator/score 1050.

Subsequently, once the aggregate metric category sub scores have been determined, an overall aggregate quantifiable indicator/score 1060 is determined by assigning a weighting value to each of the metric category sub scores. The weighting value corresponds to the significance of the metric category as it pertains to determination of likelihood of object renunciation. The weighted sub scores are then summed to result in the overall aggregate quantifiable indicator score of the extracted metric data.

Referring to FIG. 7, a flow diagram is depicted of a method 1100 for determining the likelihood of object renunciation post-resource event, in accordance with embodiments of the present invention. At Event 1210, object-identifying data is received for an object, such as a product or like, that a user is considering for inclusion in resource event, such as a payment transaction or the like. In specific embodiments of the method, the object identifying data is received at an application, i.e., "app" executing on a mobile communication. In such embodiments the object-identifying data may be received by implementing an image-capture device, i.e., camera or the mobile communication device to capture a coded image (e.g., barcoded UPC or the like) that, when read, provides the object-identifying data. In other specific embodiments of the method, in which the object-identifying data is received within a widget that is embedded in a web browser or the like, the object-identifying may be received in response to a trigger event (e.g., hovering over an object/product for a predetermined period of time with a pointer or some other predetermined pointer action or in response to placing an object/product in an electronic shopping cart or the like).

In response to receiving the object-identifying data, at Event 1220, user data is compiled from applications and/or services stored within or network-accessible to the computing platform that receives the object-identifying data.

In those embodiments of the method, in which the computing platform is a mobile communication and the object-identifying data is received within a first application, i.e., "app", at least a portion of the user data may be retrieved/ complied from the first application (i.e., data the user is required to input (or optional inputs) associated with registering for use of the application). Additionally, in such embodiments of the method, user data may be retrieved/ compiled from other second applications stored on or accessible to the mobile communication device or services executable on the mobile communication device. In such embodiments of the method, user configuration of the first application and/or other applications/services may provide for the first application to access other applications or services on the computing platform to retrieve user data.

In those embodiments of the method, in which the object-identifying data is received from a widget application embedded within a web browser, at least a portion of the user data may be retrieved from the widget (i.e., data the user is requires to input (or optional inputs) associated with registering for use of the widget). Additionally, in such embodiments of the method, user data may be retrieved/compiled from other second applications stored on or accessible to the device on which the widget is executing or services executable on the device on which the widget is executing. In such embodiments of the method, user configuration of the widget and/or other applications/services may provide for the widget to access other applications or services on the device to retrieve user data.

Event 1130, a plurality of data mining searches is conducted across a distributed computing network to extract data from big data sources. As previously discussed, each search is specific to a metric and, in some embodiments a metric category and is keyed to at least one the facility/service or the user. In specific embodiments of the method, the metric categories may include, but are not limited to, user attribute metric category, object/product utility metric category, object/product quality metric category, competitor objects/products metric category and other/catch-all metric category.

At Event 1140, a go/no-go indicator is determined that indicates one of (i) the user is likely to renounce the object/product post-resource event (i.e., after purchasing the product in a payment transaction), or (ii) the user is unlikely to renounce the object post-resource event. The determination is based at least on the data mined/extracted from the big data sources, the facility/service data and the user data. In specific embodiments of the invention data scoring is executed on each of the metrics searched and/or each of the metric categories and weighting values are applied to each of the metric scores and/or metric category scores that are based on the relevant of the metric or metric category to the determination of the likelihood of object renunciation. Each of the weighted metric scores or weighted metric category scores are summed to result in an overall metric score. Subsequently, statistical computation is implemented based at least on (i) the overall metric score and (ii) a confidence level rendered from AI-Based machine learning of previous likelihood of renunciation determinations to determine the go/no-go indicator.

Once the go/no-go indicator has been determined, the go/no-go indicator, along with any constructed supplemental data (i.e., presentations, charts, graphs and the like), is communicated back to the first application for presentation to the user. In this regard, according the present invention, the go/no-go indicator is presented to the user, such that the user can make further decisions in the event of go/no-go indicator indicates that the user is likely to renounce the object. For example, the entity may decide to assume the peril and continue considering the object for inclusion on the resource event (or include the object in the resource event), forego including the object in the resource event, or identify one or more other objects for inclusion in the resource event that the user is more likely to retain and/or utilize post-resource event.

As evident from the preceding description, the systems, methods and the like described herein represents an improvement insuring object satisfaction post-resource event and, specifically, big data searches, statistical computation and machine learning/Artificial Intelligence (AI) are leveraged to determine the likelihood that a user will renounce an object/product post-resource event/payment transaction. Specifically, the present invention relies on object/product-identifying data and user data to key a plurality of data mining searches of big data sources. In response to extracting responsive data from the big data sources, the present invention implements statistical computing to determine a go/no-go indicator, i.e., a so-called "sticky bit value" or the like that indicates either that (i) the user is unlikely to renounce (i.e., abandon, fail to use and/or return) the object/product post-resource event/payment transaction, or (ii) the user is likely to renounce (i.e., abandon, fail to use and/or return) the object/product post-resource event. In additional embodiments of the invention, Artificial Intelligence (AI) is used to analyze previous likelihood of renunciation determinations to determine a confidence level which is used in the statistical computation of the go/no-go indicator. In response to determining the indicator and compiling support data in the form of charts, graphs, presentations or the like, the indicator and support data are returned to the user who then can make an informed decision on whether or to include the object/product in a subsequent resource event/payment transaction.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for implementing an improvement in Artificial Intelligence-based machine learning to predict, prior to a financial transaction, a likelihood of post-financial transaction renunciation of a service or a product by a user, the system comprising:
a first computing platform including a first memory and one or more first processing devices in communication with the first memory, wherein the first memory stores a first application, executable by the one or more first processing devices and configured to:
receive service or product-identifying data associated with a service or object that a user is considering for inclusion in a financial transaction,
in response to receiving the service or product-identifying data, compile user data from the first application and at least one of one or more second applications and services stored within the first memory or executing on the first computing platform, and
communicate the service or product-identifying data and the user data to a network-based computing platform;
the network-based computing platform including a second memory and one or more second processing devices in communication with the second memory, wherein the second memory stores a distributed computing data mining engine, a statistical computing engine and an Artificial Intelligence (AI)-based machine-learning engine, executable by the one or more second processing devices, wherein the distributed computing data mining engine is configured to:

receive the service or product-identifying data and the user data communicated from the first application, and conduct a plurality of data mining searches of big data sources to extract data keyed to at least one of the user data and the service or product-identifying data, wherein the (AI)-based machine-learning engine is configured to:

machine learn, over time, from results of previous determinations of the likelihood of post-financial transaction renunciation of services and products associated with the service or the product and other users, and communicate an output of the machine-learning to the statistical computing engine, wherein the output of the machine-learning defines a confidence level, wherein the statistical computing engine is configured to:

determine, based at least on (i) the extracted data, (ii) the user data, (iii) the service or product-identifying data, and (iv) the confidence level, a go/no-go indicator that indicates one of the user is (a) likely to renounce the service or the product post-financial transaction, or (b) unlikely to renounce the service or the product post-financial transaction, wherein renouncing the financial transaction post-financial transaction is defined as at least one of (i) failing to use the service or the product post-financial transaction, (ii) abandoning the service or the product post-financial transaction and (iii) returning the service or the product to an entity that conducted the financial transaction with the user, and communicate the go/no-go indicator to the first application, wherein the first application is further configured to receive the go/no-go indicator and present, within a user interface, an indication that either the user is (a) likely to renounce the service or the product post-financial transaction, or (b) unlikely to renounce the service or the product post-financial transaction.

2. The system of claim 1, wherein the first computing platform comprises a mobile communication device including an image-capturing device in communication with at least one of the one or more processing devices.

3. The system of claim 2, wherein the first application is further configured to receive the the product-identifying data associated with the the product by capturing, with the image-capturing device, an image of an product identifying code provided on the product or a container containing the product object.

4. The system of claim 1, wherein the first application comprises a widget embedded within a web browser application.

5. The system of claim 1, wherein the distributed computing data mining engine is configured to conduct the plurality of data mining searches of big data sources to extract data keyed to at least one of the user data and the service or product-identifying, wherein each of the plurality of data mining searches is associated with one of a plurality of metrics for determining a likelihood of post-financial transaction resource event renunciation of the service or the product.

6. The system of claim 5, wherein the statistical computing engine is configured to:

determine, based on the extracted data, a quantifiable indicator for each of the plurality of metrics, weight each of the quantifiable indicators based on relevance to likelihood to renounce the service or the product post-financial transaction, determine, based on each of the weighted quantifiable indicators, an overall quantifiable indicator of the likelihood of the user to renounce the service or the product post-financial transaction, and implement the overall quantifiable indicator in the statistical computation determine the go/no-go indicator.

7. The system of claim 1, the second memory of the network-based computing platform further stores a charting and presentation engine, executable by the one or more second processing devices and configured to:

construct at least one of one or more back-up data charts and presentations that provide back-up data used in determining the go/no-go indicator that indicates one of the user is (a) likely to renounce the service or the product post-financial transaction, or (b) unlikely to renounce the service or the product post-financial transaction, and communicate the at least one of one or more back-up charts and presentations to the first computing platform.

8. An apparatus for implementing an improvement in Artificial Intelligence-based machine learning to predict, prior to a financial transaction, a likelihood of post-financial transaction renunciation by a user, the apparatus comprising:

a computing platform including a memory and one or more processing devices in communication with the memory, wherein the memory stores:

a distributed computing data mining engine, executable by the one or more processing devices and configured to:

receive service or product-identifying data and user data communicated from a first application, and conduct a plurality of data mining searches of big data sources to extract data keyed to at least one of the user data and the service or product-identifying data, an Artificial Intelligence-based machine-learning engine, executable by the one or more processing devices and configured to:

machine learn, over time, from results of previous determinations of the likelihood of post-financial transaction object renunciation of services and products associated with the service or the product and other users, and communicate an output of the machine-learning to a statistical computing engine, wherein the output of the machine-learning defines a confidence level, the statistical computing engine, executable by the one or more processing devices and configured to:

determine, based at least on (i) the extracted data, (ii) the user data, (iii) the object-identifying data, and (iv) the confidence level, a go/no-go indicator that indicates one of the user is (a) likely to renounce the service or the product post-financial transaction, or (b) unlikely to renounce the service or the product post-financial transaction, wherein renouncing the financial transaction post-financial transaction is defined as at least one of (i) failing to use the service or the product post-financial transaction, (ii) abandoning the service or the product post-financial transaction and (iii) returning the service or the product to an entity that conducted the financial transaction with the user, and communicate the go/no-go indicator to the first application.

9. The apparatus of claim 8, wherein the first application is one selected from the group consisting of (i) a mobile communication device application, and (ii) a widget embedded in a web browser.

10. The apparatus of claim 8, wherein the distributed computing data mining engine is configured to:
conduct the plurality of data mining searches of big data sources to extract data keyed to at least one of the user data and the service or product-identifying, wherein each of the plurality of data mining searches is associated with one of a plurality of metrics for determining likelihood of post-financial transaction renunciation of the service or the product.

11. The apparatus of claim 10, wherein the statistical computing engine is configured to:
determine, based on the extracted data, a quantifiable indicator for each of the plurality of metrics,
weight each of the quantifiable indicators based on relevance to likelihood renounce the service or the product post-financial transaction,
determine, based on each of the weighted quantifiable indicators, an overall quantifiable indicator of the likelihood of the user to renounce the service or the product post-financial transaction, and
implement the overall quantifiable indicator in the statistical computation to determine the go/no-go indicator.

12. The apparatus of claim 8, wherein the memory of the computing platform further stores charting and presentation engine, executable by the one or more processing devices and configured to:
construct at least one of one or more back-up data charts and presentations that provide back-up data used in determining the go/no-go indicator that indicates one of the user is (a) likely to renounce the service or the product post-financial transaction, or (b) unlikely to renounce the service or the product post-financial transaction, and
communicate the at least one of one or more back-up charts and presentations to the first application.

13. A computer-implemented method for implementing an improvement in Artificial Intelligence-based machine learning to predict, prior to a financial transaction, a likelihood of post-financial transaction renunciation of a service or a product by a user, the method is executed by one or more computing processor devices and comprises:
receiving, from a first application, service or product-identifying data associated with a service or a product that a user is considering for inclusion in a financial transaction;
in response to receiving the service or product-identifying data, compiling user data from the first application and at least one of one or more second application and one or more services stored within or network-accessible to a computing platform executing the first application;
conducting, via a distributed computing network, a plurality of data mining searches of big data sources to extract data keyed to at least one of the user data and the service or product-identifying data;
machine learning, over time by an Artificial Intelligence-based machine-learning engine, from results of previous determinations of the likelihood of post-financial transaction renunciation of services and products associated with the service or the product and other users;
communicating an output of the machine-learning to a statistical computing engine, wherein the output of the machine-learning defines a confidence level;
determining, using the statistical computing engine and based at least on (i) the extracted data, (ii) the user data, (iii) the object-identifying data and (iv) the confidence level, a go/no-go indicator that indicates one of the user is (a) likely to renounce the object post-resource event, or (b) unlikely to renounce the object post-resource event, wherein renouncing the object post-resource event is defined as at least one of (i) failing to use the object post-resource event, (ii) abandoning the object post-resource event and (iii) returning the object to an entity that conducted the resource event with the user;
presenting the go/no-go indicator on the first application.

14. The computer-implemented method of claim 13, wherein receiving further comprises receiving, at a mobile communication device, the service or product-identifying data associated with the service or the product that the user is considering for inclusion in the financial transaction.

15. The computer-implemented method of claim 13, wherein receiving further comprises capturing, at the mobile communication device, an image of a product-identifying code provided on the product or a container containing the product and reading the product-identifying code.

16. The computer-implemented method of claim 13, wherein receiving further comprises receiving, at a widget embedded in a web browser, the service or product-identifying data associated with the service or the product that the user is considering for inclusion in the financial transaction.

17. The computer-implemented method of claim 13, wherein conducting the plurality of data mining searches of big data sources further comprises conducting the plurality of data mining searches of big data sources to extract data keyed to at least one of the user data and the service or product-identifying data, wherein each of the plurality of data mining searches is associated with one of a plurality of metrics for determining likelihood of post-financial transaction renunciation of the service or the product.

18. The computer-implemented method of claim 16, wherein determining the go/no-go indicator further comprises:
determining, based on the extracted data, a quantifiable indicator for each of the plurality of metrics;
weighting each of the quantifiable indicators based on relevance to likelihood renounce the service or the product post-financial transaction;
determining, based on each of the weighted quantifiable indicators, an overall quantifiable indicator of the likelihood of the user to renounce the service or the product post-financial transaction; and
implementing the overall quantifiable indicator in the statistical computation determine the go/no-go indicator.

* * * * *